(12) United States Patent
Kanebako et al.

(10) Patent No.: US 6,753,631 B2
(45) Date of Patent: Jun. 22, 2004

(54) MAGNETICALLY LEVITATED MOTOR (75) Inventors: Hideki Kanebako, Nagano (JP); Yohji Okada, Ibaraki (JP)

(73) Assignee: Sankyo Seiki Mfg., Ltd., Nagano (JP)

( * ) Notice: Subject to any disclaimer, the term of this patent is extended or adjusted under 35 U.S.C. 154(b) by 0 days.

(21) Appl. No.: 10/127,337

(22) Filed: Apr. 19, 2002

(65) Prior Publication Data

US 2002/0180292 A1 Dec. 5, 2002

(30) Foreign Application Priority Data

Apr. 25, 2001 (JP) ........................................ 2001-128316

(51) Int. Cl.⁷ .............................................. H02K 7/09
(52) U.S. Cl. ...................................................... 310/90.5
(58) Field of Search .................................. 310/90.5, 90

(56) References Cited

U.S. PATENT DOCUMENTS 3,823,990 A * 7/1974 Gillinson, Jr. ............. 310/90.5
6,053,705 A     4/2000 Schob et al.

FOREIGN PATENT DOCUMENTS

| JP | 03-032338 | 2/1991 | |
|----|-----------|--------|---|
| JP | 2001-078389 | 3/2001 | |
| JP | 2001078389 A * | 3/2001 | ............ H02K/7/09 |
| WO | 98/59407 | 12/1998 | |

OTHER PUBLICATIONS

Barthod, et al., "Design of An Actuator Being Both A Permanent Magnet Synchronous Motor and A Magnetic Suspension" IEEE Transactions on Magnetics, IEEE Inc., New York, US vol. 34, No. 4 part 1Jul. 1998, pp. 2105–2107.
European Search Report for Appl. No. 02252893.9 7/02.
U.S. patent application No. 09/750,512 filed Dec. 28, 2000.
U.S. patent application No. 09/750,513 filed Dec. 28, 2000.

* cited by examiner

*Primary Examiner*—Burton Mullins
(74) *Attorney, Agent, or Firm*—Hogan & Hartson, L.L.P.

(57) ABSTRACT

A magnetic levitation motor has a rotor with a rotor magnet magnetized in multiple poles, and a stator with rotor driving coils disposed confronting to the rotor magnet for generating a rotational torque on the rotor, and bearing coils for generating a bearing force in a direction perpendicular to a rotational axis of the rotor. The rotor driving coils and the bearing coils are shifted with respect to one another in a circumferential direction to avoid overlapping with one another. A displacement sensor is provided for detecting displacement of the rotor with respect to a plane that is perpendicular to the rotational axis of the rotor, wherein the rotor is rotated by the rotor driving coils, and the currents flowing in the bearing coils are controlled in accordance with output of the displacement sensor to keep the rotational axis of the rotor at a predetermined position.

13 Claims, 10 Drawing Sheets

MAGNETICALLY LEVITATED MOTOR

BACKGROUND OF THE INVENTION

1. Field of the Invention

The present invention relates to a magnetically levitated motor in which a rotor is magnetically supported in non-contact and rotatable manner. In particular, the present invention relates to improvements in the winding structure within a magnetically levitated motor.

2. Description of Related Art

Figure 11:
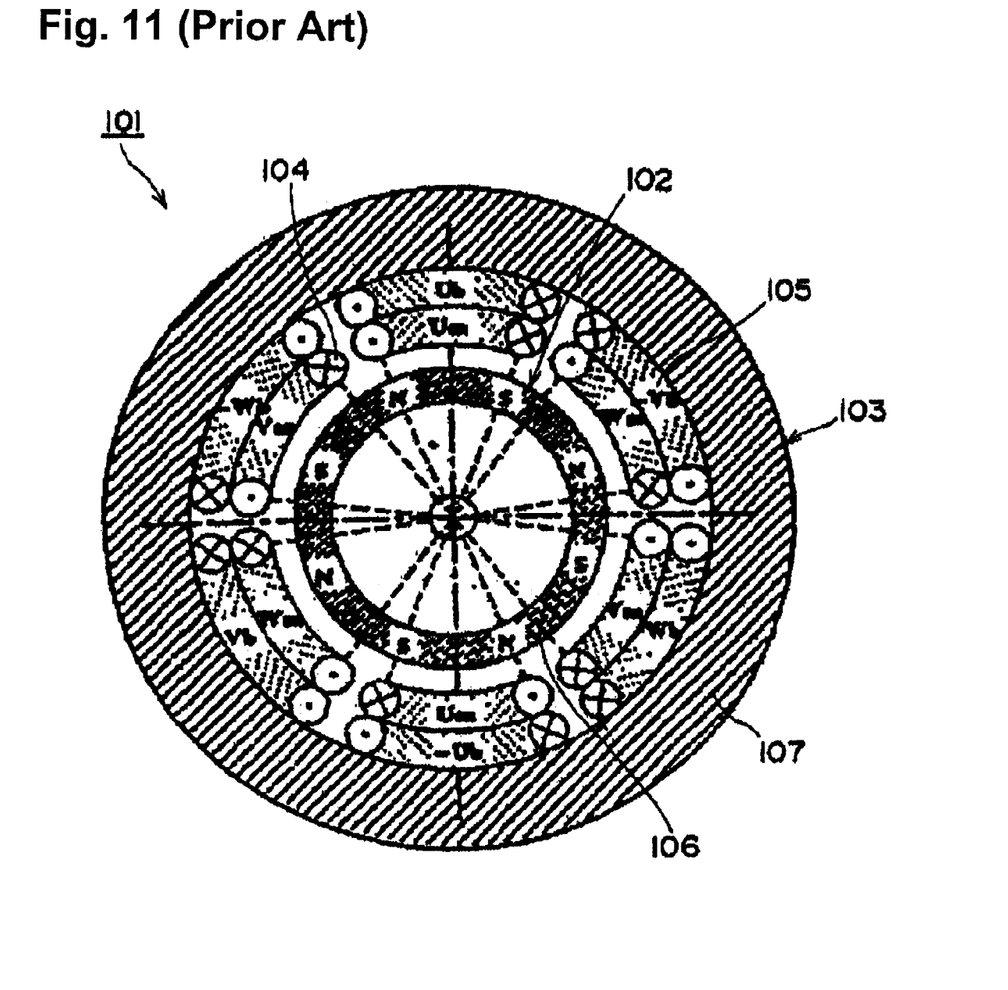
FIG. 11 schematically shows a plan view of a structure of a conventional magnetic levitation motor.
Figure 12:
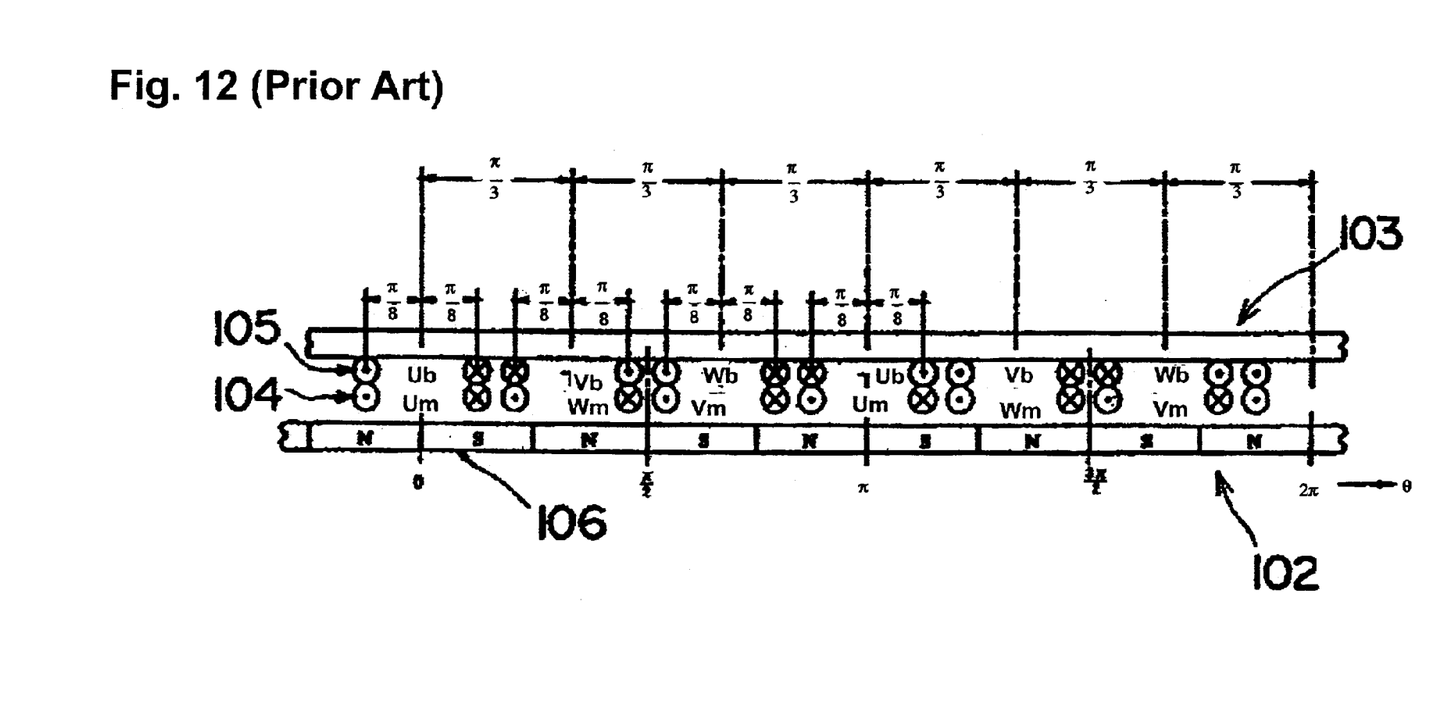
FIG. 12 is a developed diagram for explaining the principle of generating a rotational torque and generating a levitational force in the conventional magnetic levitation motor.
Figure 13:
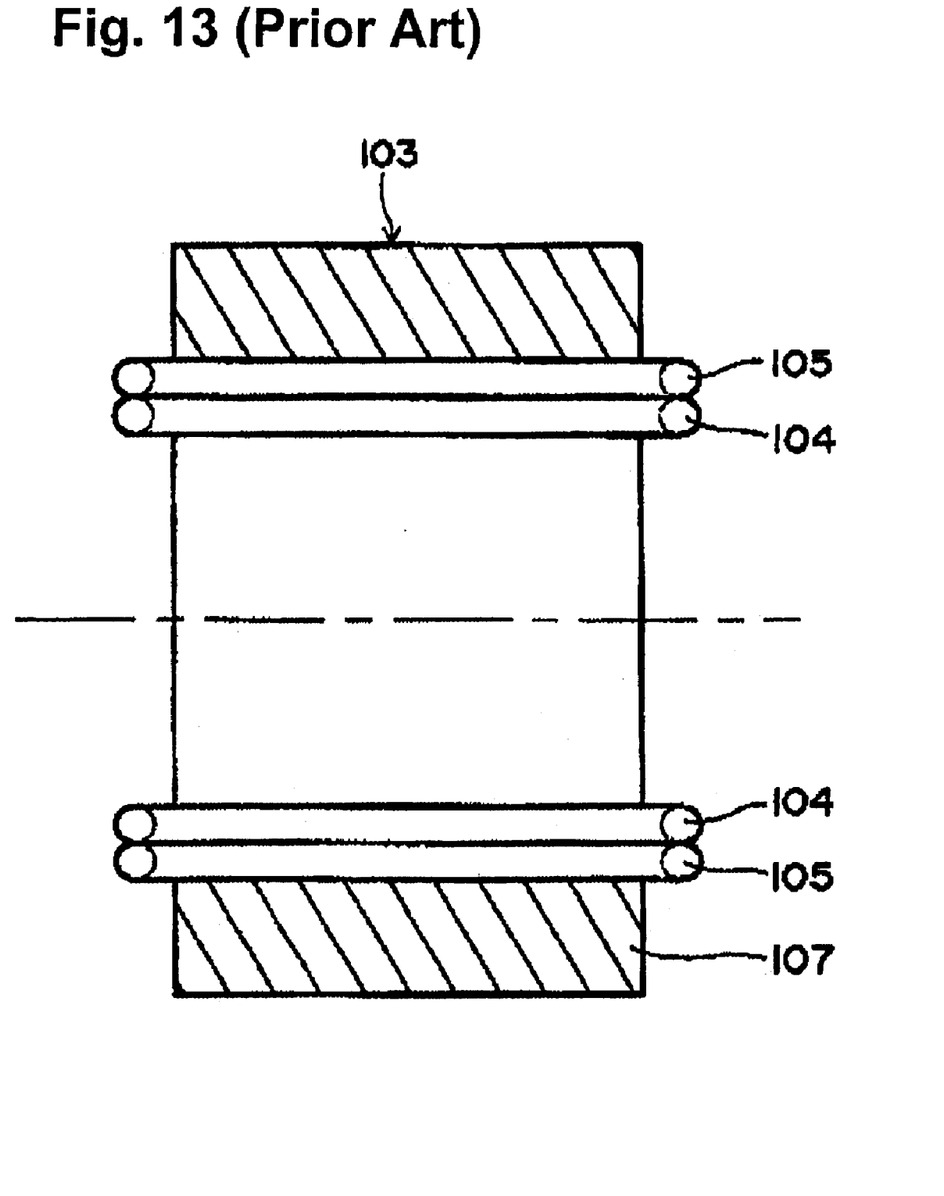
FIG. 13 schematically shows a vertical cross-sectional view of a conventional magnetic levitation motor, showing one configuration example of rotor driving coils and bearing coils.

Magnetic bearings have been used for supporting rotary members in non-contact manner. A typical conventional radial type magnetically levitated motor 101 is shown in FIG. 11. The conventional radial type magnetically levitated motor 101 is proposed which integrates functions as a magnetic bearing and a motor. This type of conventional magnetically levitated motor 101 developed so far includes a Lorentz force magnetically levitated motor 101 with a stator 103 including six concentrated coils arranged on an 8-pole rotor 102. In this magnetically levitated motor 101, rotor driving coils 104 are disposed at the same locations where the six bearing coils 105 are disposed, as shown in FIGS. 11–13, both of which occupy the space between the rotor 102 and the stator 103.

However, when the rotor driving coils 104 and bearing coils 105 are disposed in two stages in a radial direction, the space between the magnet 106 and the back yoke 107 becomes greater, which causes a waste in the space, and may make it difficult to secure a sufficient coil space. This leads to a problem that the torque and levitational force diminish.

SUMMARY OF THE INVENTION

The present invention provides a magnetic levitation motor that effectively uses the space that has conventionally been wasted to increase the torque and levitational force.

In accordance with one embodiment of the present invention, a magnetic levitation motor comprises: a stator and a rotor confronting to the stator, in which the rotor is supported in a freely rotatable and non-contact manner, wherein the rotor has a rotor magnet magnetized in multiple poles, and the stator has rotor driving coils disposed opposing to the rotor magnet for generating a rotational torque on the rotor, and bearing coils for generating a bearing force in a direction perpendicular to a rotational axis of the rotor, wherein the rotor driving coils and the bearing coils are arranged along a circumferential direction in a manner shifted with respect to one another to avoid overlapping with one another. A displacement sensor is provided for detecting displacement of the rotor with respect to a plane which is perpendicular to the rotational axis of the rotor, wherein currents flowing in the bearing coils are controlled in accordance with output of the displacement sensor to keep the rotational axis of the rotor at a predetermined position.

In the above magnetic levitation motor, the rotor driving coils and bearing coils are disposed generally on the same circumference, in other words, in the same radial distance from the rotational axis of the rotor, without being superposed with one another in a radial direction. This configuration increases (for example, doubles) the occupancy rate of the coils and therefore substantially increases the rotational torque and the levitational force. In this case, the two coil sets (i.e., the rotor driving coils and the bearing coils) may be disposed shifted by a regular angle with a mechanical angle (or an electrical angle). By doing so, the rotational torque and the levitational force can be controlled independently from each other. Also, in one embodiment, instead of increasing the occupancy rate of the coils, the gap distance between the rotor and the stator may be shortened to increase the magnetic flux density in the gap. This can increase the rotational torque and the levitational force. Alternatively, in another embodiment, instead of increasing the coil space, the number of turns may be kept unchanged, and the rotor-stator gap can be reduced. This would increase the magnetic flux density in the gap, which makes it possible to increase the torque and levitational force, just as in the case in which the number of turns is increased.

In accordance with one embodiment of the present invention, the stator and rotor may be arranged so as to constitute a planar confronting type motor.

In accordance with one embodiment of the present invention, the stator and rotor may be arranged so as to constitute a cylindrical confronting type motor.

In accordance with one embodiment of the present invention, the rotor driving coils and the bearing coils may have an identical shape.

In accordance with one embodiment of the present invention, the rotor driving coils and the bearing coils may be integrated by a common wire in which current for generating the rotational torque and current for generating the bearing force flow in a superposed manner through the common wire.

In accordance with one embodiment of the present invention, the stator and the rotor may be arranged in a planar confronting configuration, wherein two plane-shaped rotor magnets are arranged in a direction of the rotor axis of the rotor, the stators are disposed on both sides of the two plane-shaped rotor magnets to be interposed by the stators, and the rotor driving coils and the bearing coils are provided on both sides of each of the stators.

In accordance with one embodiment of the present invention, a pair of cylindrical rotor-stator sets may be arranged along a rotational axis of the rotors.

In accordance with one embodiment of the present invention, salient poles may be provided between the rotor driving coils and the bearing coils.

In accordance with one embodiment of the present invention, the number of poles of the rotor magnet may be eight, and the number of poles of the bearing coils of the stator may be six. In accordance with one embodiment of the present invention, the number of poles of the rotor magnet may be four, and the number of poles of the bearing coils of the stator may be six.

Other objects, features and advantages of the invention will become apparent from the following detailed description taken in conjunction with the accompanying drawings.

PREFERRED EMBODIMENTS OF THE PRESENT INVENTION

A structure of the present invention will be described in detail based on one embodiment example with reference to the accompanying drawings.

Figure 1:
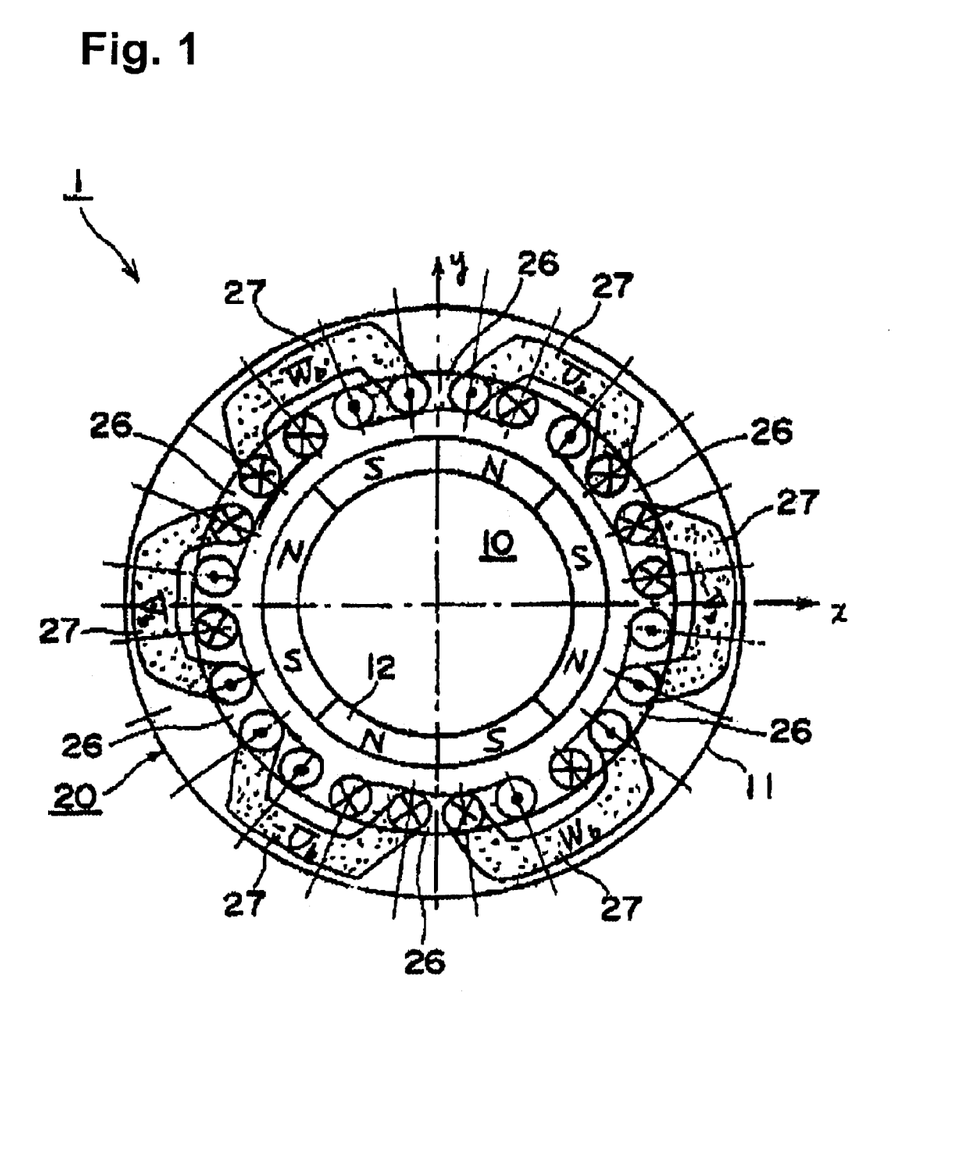
FIG. 1 schematically shows a plan view of a structure example of a magnetic levitation motor in accordance with the present invention.

FIG. 1 shows a magnetic levitation motor 1 in accordance with one embodiment of the present invention. The magnetic levitation motor 1 is a motor in which a stator 20 and a rotor 10 are disposed opposing to each other, and the rotor 10 is supported by magnetic force in a freely rotatable manner. The rotor 10 has a rotor magnet 12 magnetized in multiple poles. The stator has rotor driving coils 26 disposed opposing to the rotor magnet 12 for generating a rotational torque on the rotor 10, and bearing coils 27 for generating a bearing force in a direction orthogonal to a rotational axis of the rotor. The rotor driving coils 26 and the bearing coils 27 are shifted with respect to one another in a circumferential direction to avoid overlapping with one another. There is provided a displacement sensor for detecting displacement of the rotor 10 with respect to a plane that is perpendicular to the rotational axis of the rotor 10. The rotor 10 is rotated by the rotor driving coils 26, and currents flowing in the bearing coils 27 are controlled in accordance with output of the displacement sensor to keep the rotational axis of the rotor 10 at a predetermined position.

In the magnetic levitation motor 1 in accordance with the present embodiment, a rotational torque is generated through an interaction between the rotor driving coils 26 and the rotor magnet 12. More specifically, currents, which are in phase, are fed to the coils which are oppositely located in the coil arrangement of the rotor driving coils 26. Lorentz forces LF are generated in opposite directions, and a rotational torque is generated. Also, a levitational force (bearing force) is generated by an interaction between the bearing coils 27 and the rotor magnet 12. More specifically, currents are fed to the coils oppositely located in the coil arrangement of the bearing coils 27. As a result, Lorentz forces LF are generated in the same direction, so that a force in the radial direction, i.e., a levitational force is generated.

The stator 20 includes the rotor driving coils 26 for generating a rotational torque, and the bearing coils 27 for generating a bearing force in the radial direction of the rotor 10. In the magnetic levitation motor 1 of the present embodiment, the number of poles of the rotor magnet 12 is 8, and the number of poles of the bearing coils 27 of the stator 20 is six, as shown in FIG. 1. Those sets of rotor driving coils 26 and bearing coils 27 consist of six coils each, and disposed in a manner to overlap one another on the stator core.

The rotor 10 includes a back yoke 11, and a rotor magnet 12 secured to one face of the back yoke 11. The rotor magnet 12 is magnetized to have eight poles arrayed in the circumferential direction. The rotor 10 and the stator 20 shown in FIG. 1 are disposed in state that their faces confront with each other, and the rotor 10 is supported by an appropriate thrust bearing member, whereby a face confronting type motor is formed.

In this case, in the stator 20, either one of the set of rotor driving coils 26 or the set of bearing coils 27 is shifted with respect to the other, to thereby increase the coil occupancy rate. This arrangement can increase the rotational torque and the levitational force. For example, in the present embodiment in which the set of bearing coils 27 has six poles, levitation coils Ub, Vb and Wb that compose the bearing coils 27 are shifted clockwise from locations of the rotor driving coils 26 through 30 degrees, respectively, as shown in FIG. 1 and FIG. 2.

Figure 3:
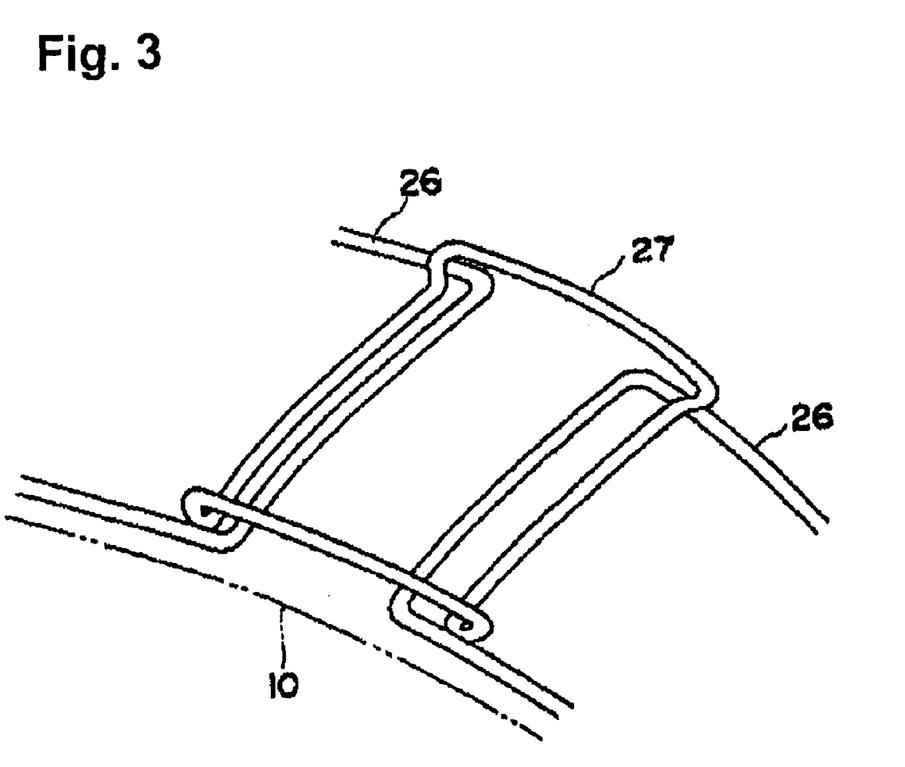
FIG. 3 is a perspective view of a configuration example of rotor driving coils and bearing coils.
Figure 4:
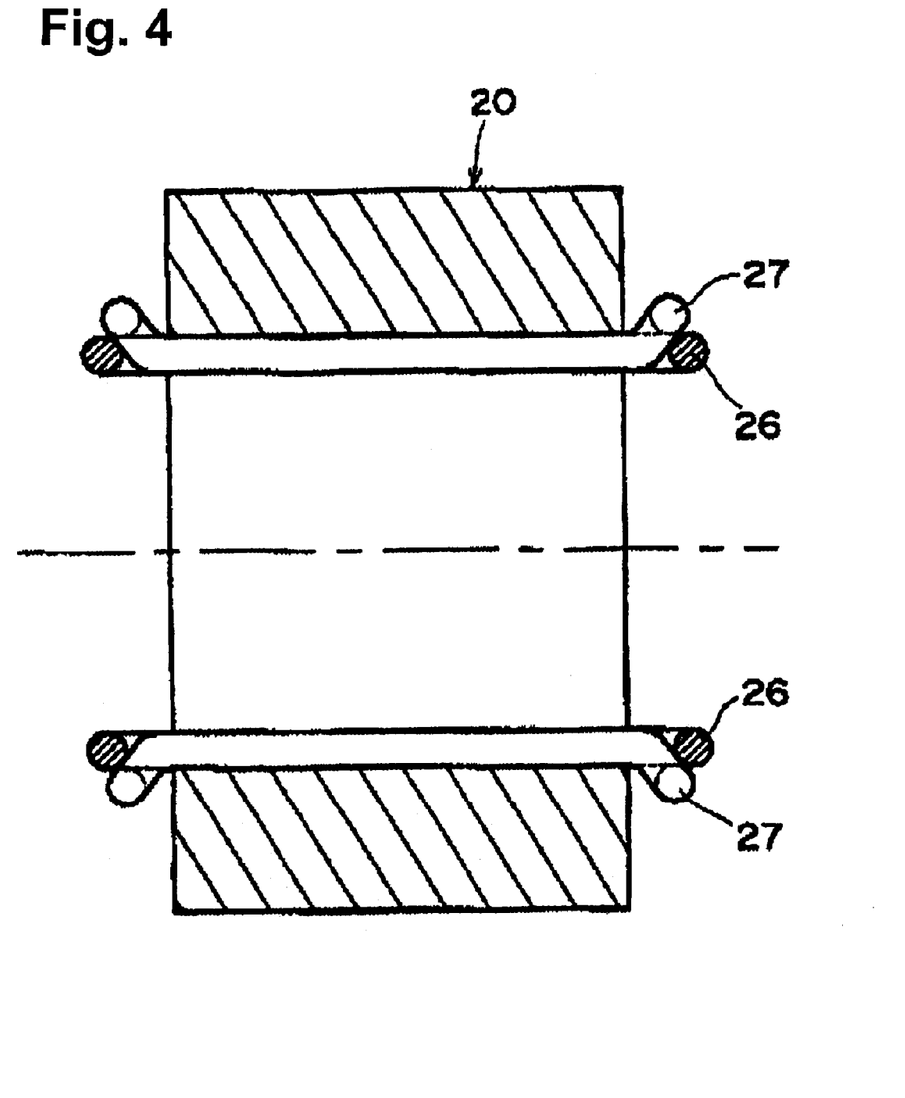
FIG. 4 schematically shows a cross-sectional view of a magnetic levitation motor, showing one configuration example of rotor driving coils and bearing coils.

As shown in FIGS. 3 and 4, the rotor driving coil 26 is a generally rectangular coil that is spaced a constant distance from the rotational axis. In contrast, the bearing coil 27 is a rectangular coil having two stages that are formed by bending the coil so as to be spaced different distances from the rotational axis. In this case, the bearing coil 27 passes inside the rectangular rotor driving coils 26 where it contacts the back yoke 11, but radially extend outwardly to pass outside the rotor driving coils 26 where it does not contact the back yoke 11. Accordingly, in the magnetic levitation motor 1 of the present embodiment, the rotor driving coils 26 and the bearing coils 27 are arranged shifted in the circumferential direction so as not to overlap with one another, so that a thickness equivalent to one stage of the coil is sufficient for the space for disposing the coils between the rotor 10 and the stator 20. As a result, the gap between the rotor 10 and the stator 20 can be narrowed, such that the gap magnetic flux density is increased, and the torque and levitational force are increased. If the gap is not narrowed, the winding number of the coils may be increased to increase the torque and levitational force.

Figure 2:
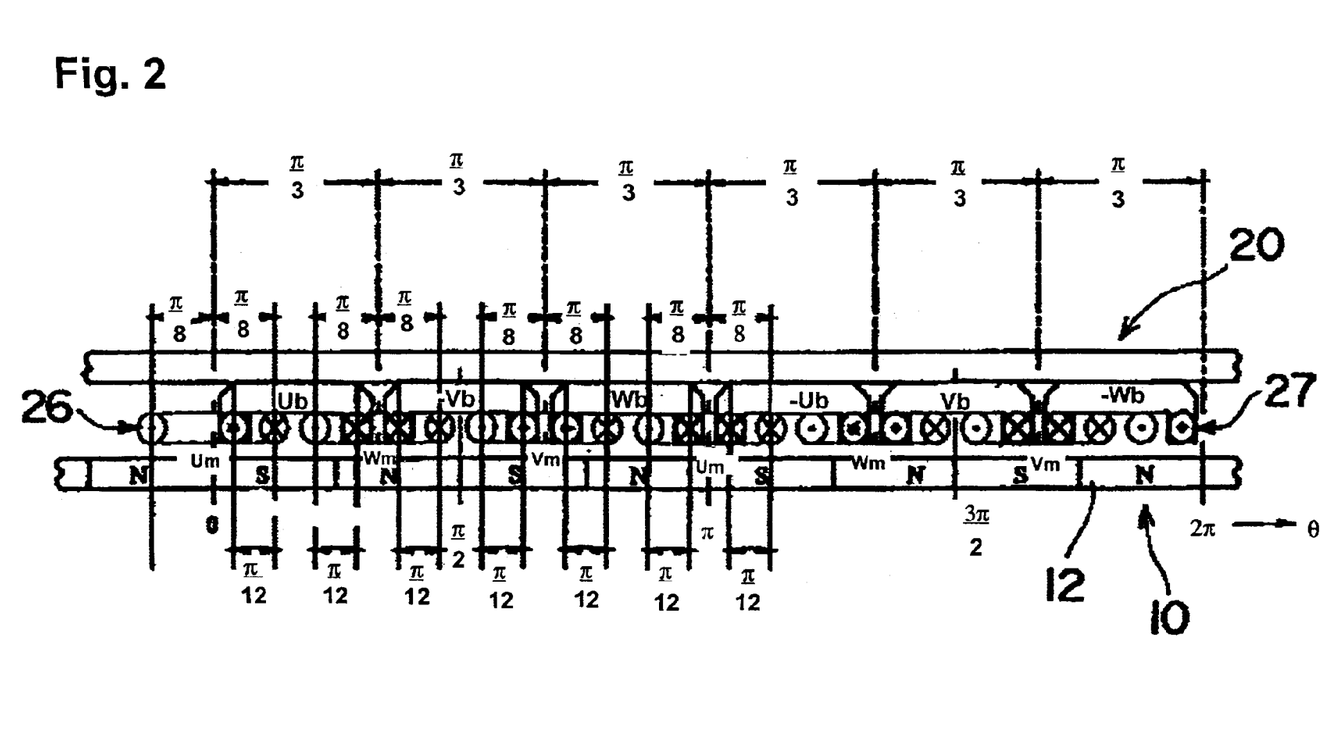
FIG. 2 is a developed diagram for explaining the principle of generating a rotational torque and generating a levitational force in the motor of the embodiment.

Also, FIG. 2 shows positional relationships between the coils and the magnetic poles of the rotor magnet 12 for one turn by developing the magnetically levitated motor 1 in the radial direction. The rotation and bearing coils 26 and 27 of U, V and W phases are disposed on the stator core. The rotor magnet 12 with eight magnetic poles is mounted on the rotor 10. A magnetic flux Bg, which sinusoidally varies and is mathematically given by the following expression (1), is generated in an air gap between the rotor 10 and the stator 20.

[Expression 1]

$$Bg = -B \sin(\omega t + 4\theta) \quad (1)$$

Description will be given about a principle of generating a rotational torque in the present embodiment. Six concentrated coils of three (Um, Wm and Vm) phases are arranged on the stator 20 while being spaced every $\pi/3$. The going and returning wires of each phase coil are spaced $\pi/4$ so as to generate a maximum torque. 3-phase currents given by the following expression (2) are fed to the coils of those phases.

[Expression 2]

$$I_U = A\cos(\omega t + \varphi)$$
$$I_V = A\cos\left(\omega t + \frac{2}{3}\pi + \varphi\right)$$
$$I_W = A\cos\left(\omega t + \frac{4}{3}\pi + \varphi\right)$$
(2)

The variables in the above equations are:
B: wave height value of magnetic flux density of magnet
ω: angular frequency
t: time
θ: rotation coordinates fixed on the stator
A: wave height value of current
φ: phase difference between magnetic flux generated by coils and rotor
$l_m$: entire effective length of bearing coil A half cycle of the motor current that flows along the circumference can be expressed by Expression (3) as follows, using Dirac delta function.
[Expression 3]

$$i_1 = I_U\left[\delta\left(\theta - \frac{\pi}{8}\right) - \delta\left(\theta - \frac{\pi}{8}\right)\right] + I_W\left[\delta\left(\theta - \frac{5}{24}\pi\right) - \delta\left(\theta - \frac{11}{24}\pi\right)\right] +$$
$$I_V\left[\delta\left(\theta - \frac{13}{24}\pi\right) - \delta\left(\theta - \frac{19}{24}\pi\right)\right]$$
(3)

A rotational torque generated by this current is developed according to Fleming's rule and given by Expression (4). The torque was calculated on the assumption that the same current will flow in the remaining half period, and it is two times as large as that for the half period.
[Expression 4]

$$T = 2r\,l_m \int_{-\frac{\pi}{8}}^{\frac{7}{8}\pi} Bg\, i_1\, d\theta$$
$$= 2r\,l_m AB[2\cos(\omega t + \varphi)\cos(\omega t) -$$
$$2\cos\left(\omega t + \frac{4}{3}\pi + \varphi\right)\cos\left(\omega t + \frac{1}{3}\pi\right) -$$
$$2\cos\left(\omega t + \frac{2}{3}\pi + \varphi\right)\cos\left(\omega t + \frac{1}{6}\pi\right)]$$
$$= 6r\,l_m AB\cos\varphi$$
(4)

As see from the above expression, the magnetic levitation motor 1 of the present embodiment is capable of producing a fixed rotational torque independently of a position of the rotor and time.

Furthermore, the following motor controls can be performed by the utilization of the phase φ of the 3-phase current, in a similar manner as the ordinary synchronous motor.

φ=0° Servomotor control by wave height value A
φ=90° Synchronous motor with no load
0°<φ<90° Synchronous motor with load In the above embodiment, the number of the magnetic poles of the rotor magnet 12 is eight, but the number of the coils of the stator corresponds to the case of the four magnetic poles. Nevertheless, the magnetically levitated motor 1 of the embodiment can perform the controls just as the PM synchronous motor does. The length of the coil end is considerably short, and suffers from less ohmic loss. A relationship between the electric angular frequency ω and the mechanical frequency ωm is given by the following Expression (5) as in the case of the 8-pole motor.
[Expression 5]

$$\omega = (P/2)\omega m,\ P=8 \quad (5)$$

Next, a levitational force control in the present embodiment will be described. A coil arrangement of the bearing coils 27 for generating a levitational force in the radial direction is shown in FIG. 2. The bearing coils 27 are disposed at locations shifted from the rotor driving coils 26 by 30° (π/6), thereby forming a 3-phase/2-pole coil arrangement. 3-phase currents to be fed to the bearing coils 27 are given by the following Expression (6).
[Expression 6]

$$I_{Ub} = C\cos(\omega t + \phi)$$
$$I_{Vb} = C\cos\left(\omega t + \frac{2}{3}\pi + \phi\right)$$
$$I_{Wb} = C\cos\left(\omega t + \frac{4}{3}\pi + \phi\right)$$
(6)

The variables in the above equations are:
B: wave height value of magnetic flux density of magnet
ω: angular frequency
t: time
θ: rotation coordinates fixed on the stator
C: wave height value of radial direction control current for rotor
φ: phase difference of levitation coil current
lb: entire effective length of bearing coil In the figure, "y" represents a vertical upward direction with respect to the base of the motor, and "x" represents a horizontal lateral direction.

Currents distributed along the circumference can be approximated to those concentrated on locations of the coils, and thus can be given by the following expressions. For comparison, first, the conventional currents and levitational force are shown below.
[Expression 7]

$$i_{2old} = I_{Ub}\left[\delta\left(\theta + \frac{1}{8}\pi\right) - \delta\left(\theta - \frac{1}{8}\pi\right) - \delta\left(\theta - \frac{7}{8}\pi\right) + \delta\left(\theta - \frac{9}{8}\pi\right)\right] \rightarrow i_{u\_2old} +$$
$$I_{Vb}\left[-\delta\left(\theta - \frac{5}{24}\pi\right) + \delta\left(\theta - \frac{11}{24}\pi\right) + \delta\left(\theta - \frac{29}{24}\pi\right) - \delta\left(\theta - \frac{35}{24}\pi\right)\right] \rightarrow i_{v\_2old} +$$
$$I_{Wb}\left[\delta\left(\theta - \frac{13}{24}\pi\right) - \delta\left(\theta - \frac{19}{24}\pi\right) - \delta\left(\theta - \frac{37}{24}\pi\right) + \delta\left(\theta - \frac{43}{24}\pi\right)\right] \rightarrow i_{w\_2old}$$
(7)

Levitational forces are given by substituting the above in Fleming's left-hand rule (BIL's rule) as follows.

[Expression 8]

$$F_{x\_old} = F_{xu\_old} + F_{xv\_old} + F_{xw\_old} \quad (8)$$

$$= -\frac{3\sqrt{2+\sqrt{2}}}{2} Bl_b C \sin(\phi)$$

[Expression 9]

$$F_{y\_old} = F_{yu\_old} + F_{yv\_old} + F_{yw\_old} \quad (9)$$

$$= -\frac{3\sqrt{2+\sqrt{2}}}{2} Bl_b C \cos(\phi)$$

Levitational forces given by the expressions (8) and (9) can be freely controlled with 3-phese AC voltage C and the phase φ.

In contrast, currents on the coil distribution of the present embodiment are given by the following expression (10).

[Expression 10]

$$i_{2new} = I_{Ub}\left[\delta\left(\theta - \frac{1}{24}\pi\right) - \delta\left(\theta - \frac{7}{24}\pi\right) - \delta\left(\theta - \frac{25}{24}\pi\right) + \delta\left(\theta - \frac{31}{24}\pi\right)\right] \rightarrow i_{u\_2new} + \quad (10)$$

$$I_{Vb}\left[-\delta\left(\theta - \frac{9}{24}\pi\right) + \delta\left(\theta - \frac{15}{24}\pi\right) + \delta\left(\theta - \frac{33}{24}\pi\right) - \delta\left(\theta - \frac{39}{24}\pi\right)\right] \rightarrow i_{v\_2new} +$$

$$I_{Wb}\left[\delta\left(\theta - \frac{17}{24}\pi\right) - \delta\left(\theta - \frac{23}{24}\pi\right) - \delta\left(\theta - \frac{41}{24}\pi\right) + \delta\left(\theta - \frac{47}{24}\pi\right)\right] \rightarrow i_{w\_2new}$$

Levitational forces are given by substituting the above in Fleming's left-hand rule (BIL's rule) as follows.

[Expression 11]

$$F_{x\_new} = F_{xu\_new} + F_{xv\_new} + F_{xw\_new} \quad (11)$$

$$= -\frac{3\sqrt{2+\sqrt{2}}}{2} Bl_b C \sin\left(\phi + \frac{\pi}{6}\right)$$

[Expression 12]

$$F_{y\_new} = F_{yu\_new} + F_{yv\_new} + F_{yw\_new} \quad (12)$$

$$= -\frac{3\sqrt{2+\sqrt{2}}}{2} Bl_b C \{\cos(\phi + \frac{\pi}{6})\}$$

Also, in this case, levitational forces can be freely controlled with 3-phese AC voltage C and the phase φ.

As seen from the foregoing description, the levitational force may be controlled while independently of a rotation angle of the rotor 10. Further, it does not interfere with the rotational torque control, and is capable of generating a control force in every direction on the circumference by the phase difference φ.

Figure 5:
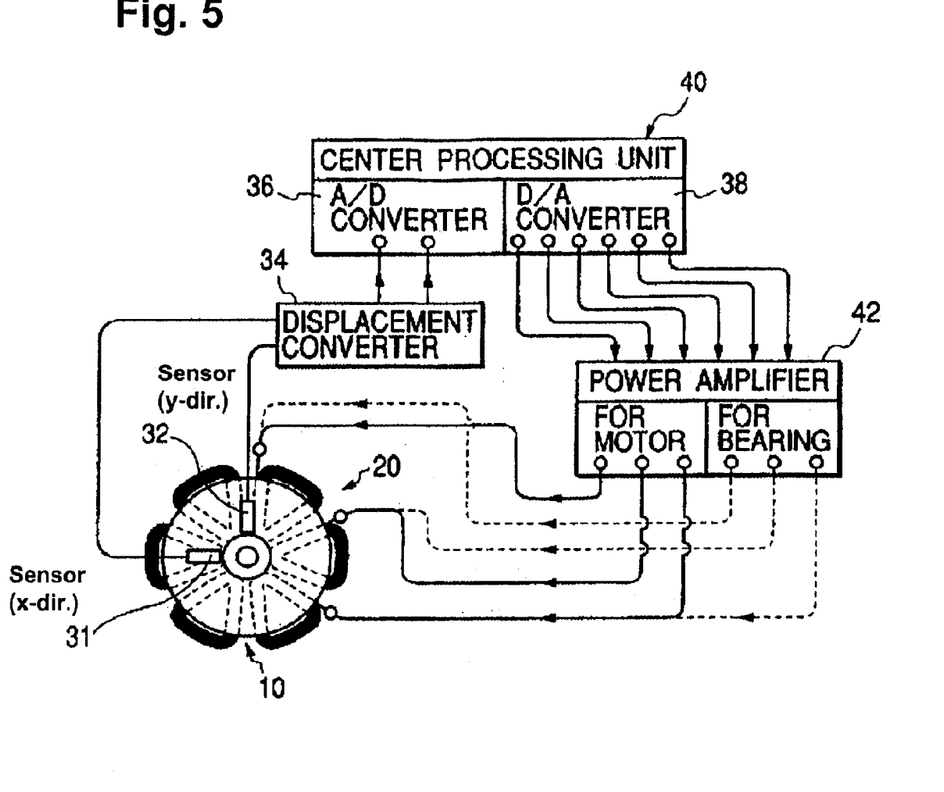
FIG. 5 shows a block diagram of one example of a control system applicable in the embodiments.

The rotation control and the levitation force control for the magnetic levitation motor 1 described above may be conducted by a control system shown as an example in FIG. 5. In FIG. 5, two displacement sensors 31 and 32 are provided to detect displacements of the rotor 10, which are orthogonal to a rotation axis of the rotor 10. The displacement sensor 31 detects displacements in the X direction, and the displacement sensor 32 detects displacements in the Y direction that is perpendicular to the X direction. Detection outputs from each of the displacement sensors 31 and 32 are sent through an appropriate converter 34 and then inputted in an analog-to-digital converter 36 to be converted into digital signals, which are then inputted in a central processing unit (hereafter referred to as "CPU") 40. The CPU outputs based on the detection outputs of the displacement sensors 31 and 32 control signals through a digital-to-analog converter 38 to control a current fed to the coils 26 and 27. The control signals are applied to a power amplifier 42, and then the power amplifier 42 outputs currents, which depend on the control signals, to the rotor driving coils 26 and the bearing coils 27. The currents fed to the bearing coils 27 are thus controlled, so that the rotary shaft of the rotor 10 is held at a predetermined angular position.

The above-described embodiment is one example of the present invention, and the present invention is not limited to this embodiment, and a variety of modifications can be made without departing from the subject matter of the present invention. For example, although the magnetically levitated motor 1 according to the present embodiment is a cylindrical confronting type motor, a magnetic levitation motor may be provided by disposing a pair of stator 20 and rotor 10 sets arranged along a rotational axis of the rotors.

Also, in the embodiment described above, the present invention is applied to a cylindrical confronting type motor. However, the present invention is also applicable to a planar confronting type motor. In the above-described embodiment, one stator 20 and one rotor 10 are confronted to one another. However, a stator 20 and a rotor 10 may be arranged in a plane confronting type, wherein plane-shaped rotor magnets 121 and 122 may be provided on both sides of a back yolk 11 of the rotor 10 in a rotational axial direction, stators 201 and 202 may be provided on both sides of the two plane-shaped rotor magnets 121 and 122, and bearing coils 261 and 263 and rotor driving coils 262 and 264 may be provided on each of the corresponding respective stators 201 and 202. By this arrangement, the rotation torque can be increased by the push-pull system, and four degrees of freedom in the radial direction can be actively controlled.

Figure 6:
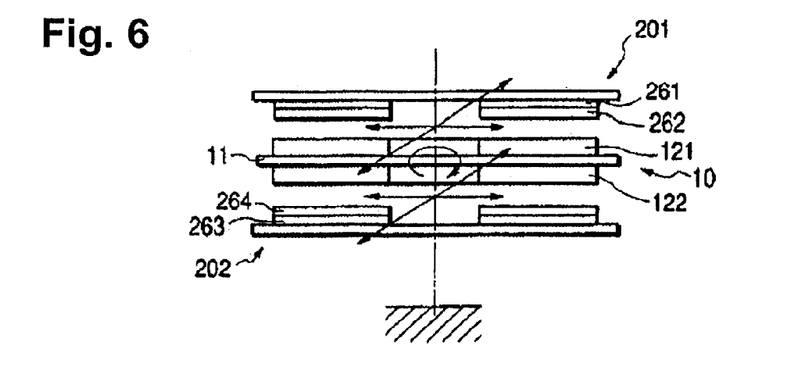
FIG. 6 shows in concept a front view of a magnetic levitation motor in accordance with another embodiment of the present invention.
Figure 7:
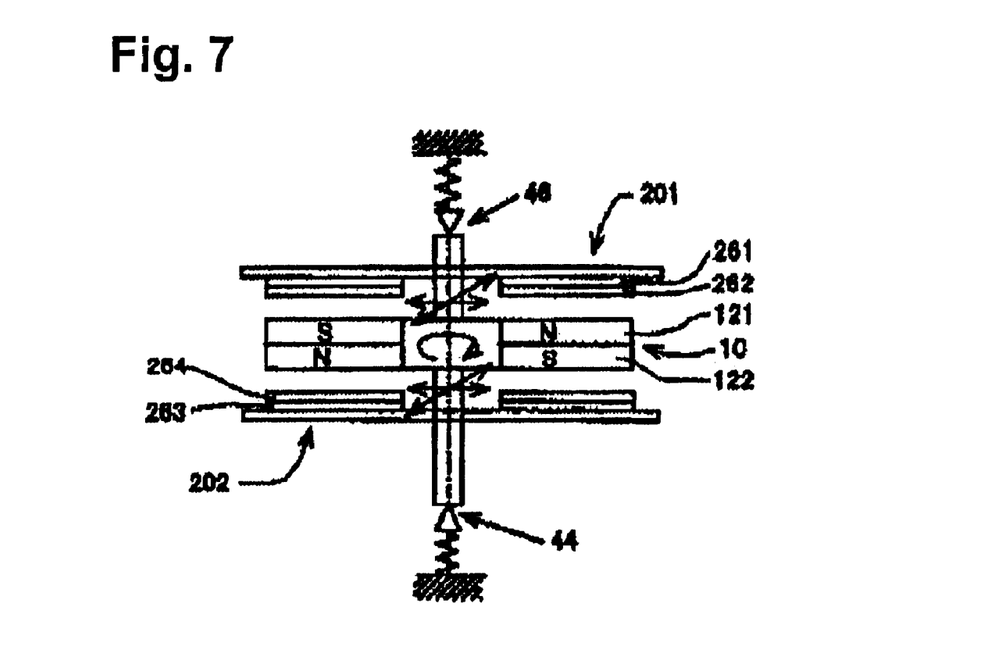
FIG. 7 shows in concept a front view of a magnetic levitation motor in accordance with another embodiment of the present invention.

In the embodiment described above, and embodiments shown in FIGS. 6 and 7, currents fed to the bearing coils and the rotor driving coils are controlled to perform a variety of controls. For example, at least control of displacements of the rotor 10 in the X direction, control of displacements of the rotor 10 in the Y direction, four-axis control for controlling inclinations of each of an X plane and a Y plane of the rotor 10, and control of the rotation torque can be conducted.

A thrust load of the rotor 10 may be supported by an appropriate thrust bearing. For example, in the example shown in FIG. 7, shafts are provided to extend from upper and lower central areas of the rotor 10, and the shafts may be freely, rotatably supported by pivots 44 and 46, respectively. Alternatively, the rotor 10 may be freely, rotatably supported by a thrust magnetic bearing in a non-contact manner.

Figure 8:
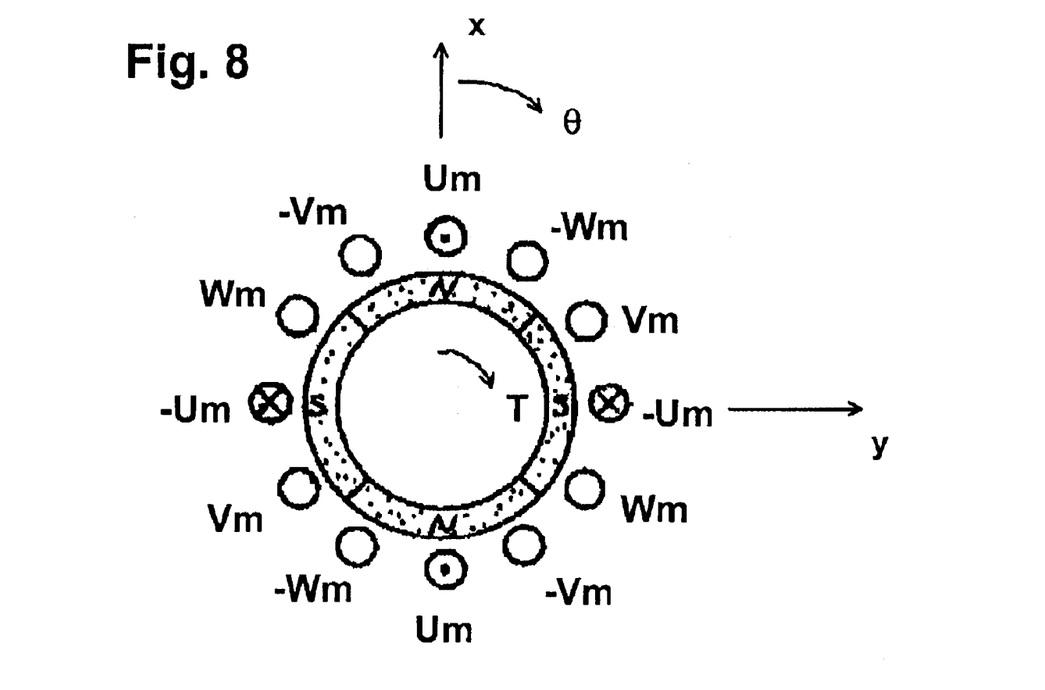
FIG. 8 schematically shows a plan view of one example of currents set with respect to the rotor driving coils.

Further, the present invention is also applicable to a case where the number of poles of the rotor magnet 12 is four. For example, as shown in FIG. 8, a magnetic levitation motor 1 has a magnet magnetized in four poles at intervals of about 90° along a rotational direction. The drive frequency of this motor is reduced to half compared to the motor in which the rotor magnet has 8 poles and the coil set has 6 poles. As a result, an effort to increase the speed of driving amplifiers becomes unnecessary, and heat generation and lowered efficiency that may be caused by an increase in iron loss can be effectively prevented.

Also, in the present embodiment, the bearing coils 27 are bent in midway, so that the bearing coils 27 are extended outside the rotor driving coils 26 in the radial direction to reduce the thickness thereof in the radial direction. Conversely, the rotor driving coils 26 may be bent. Alternatively, the rotor driving coils 26 and the bearing coils 27 may be bent to have the same shape, and arranged in a manner that parts of them overlap one another to reduce the thickness in the radial direction. In this case, the rotor driving coils 26 and the bearing coils 27 may be integrated into a single common coil set, and bearing force generating current and rotational torque generation current, while being superposed one on the other, are fed to the single common coil.

Figure 9:
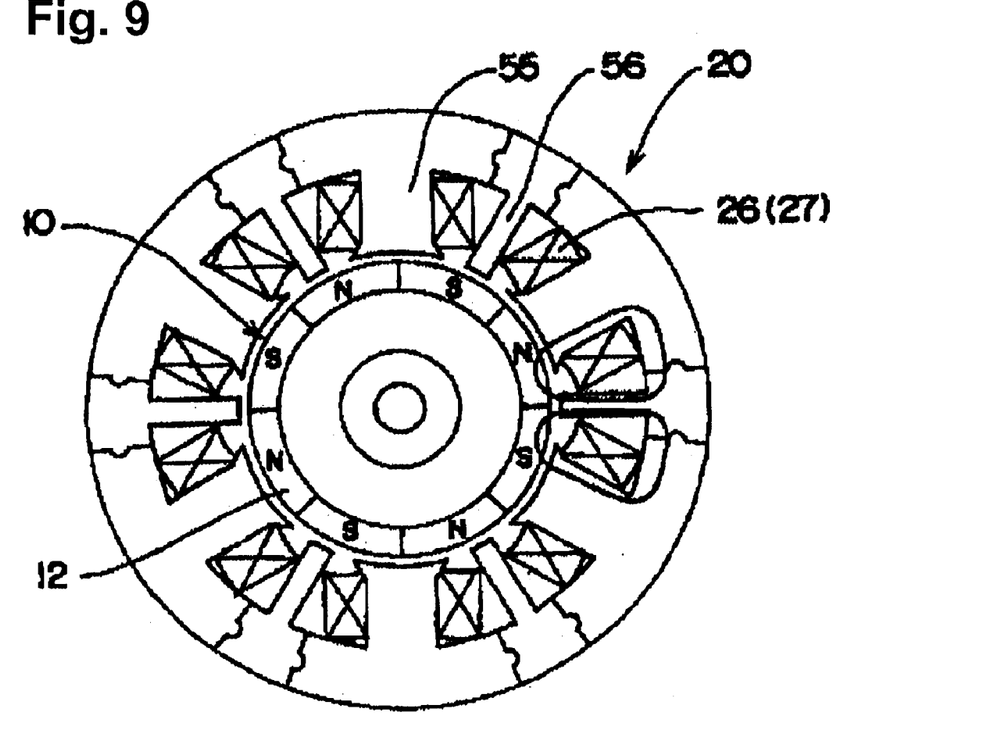
FIG. 9 shows a transverse cross-sectional view of a magnetic levitation motor in accordance with still another embodiment of the present invention.

FIG. 9 shows another embodiment in which salient poles 55 and 56 are additionally provided in the stator 20 in order to more effectively utilize the magnetic flux generated by the stator coils. The salient poles 55 are provided as main poles, and coils 26 and 27 are wound on the main poles 55. The salient poles 56 are provided as auxiliary poles and each located between the adjacent main poles. The main and auxiliary poles 55 and 56 are circumferentially arranged at the coil intervals referred to in connection with FIG. 2; the width of each main pole 55 is approximately $\pi/4$ and the width of each auxiliary pole 56 is approximately $\pi/2$. Therefore, a gap between the rotor and the stator may be reduced to be small while keeping the magnetic relationship shown in FIG. 2. Accordingly, stronger rotational force and levitational force are obtained.

Figure 10:
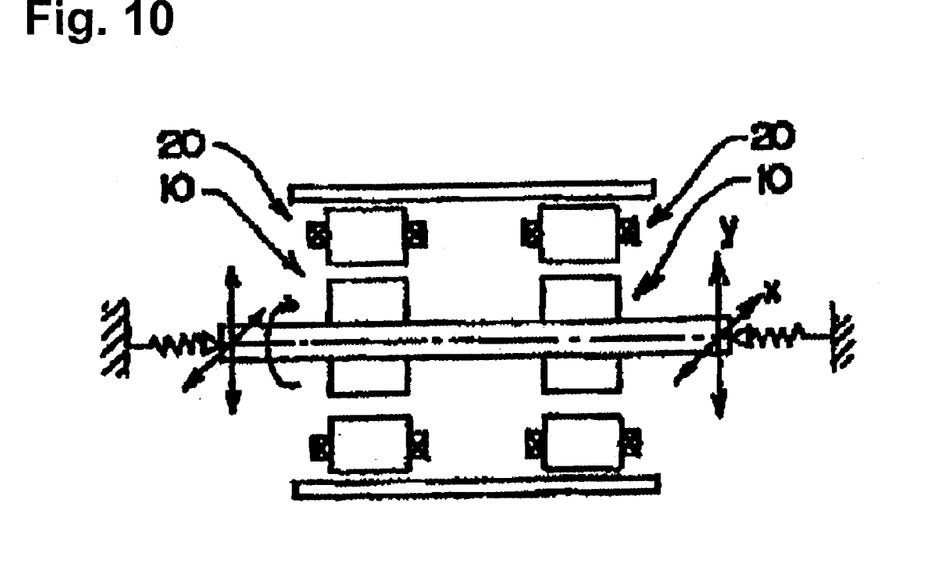
FIG. 10 shows a front view of a magnetic levitation motor in accordance with still another embodiment of the present invention.

FIG. 10 conceptually shows an embodiment in which the cylindrical type motor is further modified, wherein two cylindrical type magnetic levitation motors are arranged in the axial direction. In this embodiment, displacement control in the X direction perpendicular to the rotational axis of the rotor 10, displacement control in the Y direction perpendicular to the rotation axis of the rotor 10 and perpendicular to the X direction, four-axis control for controlling inclinations in each of the X plane and Y plane, and rotation torque control can be performed. A thrust load of the rotor 10 is supported by an appropriate thrust bearing. For example, the rotor 10 can be freely, rotatably supported by pivots. Alternatively, the rotor 10 may be freely, rotatably supported by a thrust magnetic bearing in a non-contact manner.

As is clear from the foregoing description, in the magnetic levitation motor in accordance with the present invention, rotor driving coils and bearing coils, which are disposed one on top of the other in two stages in the conventional art, are shifted from one another to be disposed on the same circumference. This configuration effectively uses the so far wasted space, increases the space for the coils, and increase the levitational force. Moreover, even through the coils are shifted from one another, the rotational torque and the levitational force can be independently controlled, and the levitation vectors can be generated in every directions by utilization of levitational 3-phese AC current values and their phases. Also, if the space for the coils is kept unchanged, the gap between the rotor and the stator can be shortened, and the gap magnetic flux density can be increased. This can likewise increase the torque and the levitational force.

Accordingly, the structure of the stator is simplified, one of the magnetic levitation control and the rotation torque control does not interfere with the other control, and the axial length can be shortened such that the critical speed can be increased accordingly.

Also, in the present invention, the stator and the rotor are arranged in a planar confronting configuration, the two plane-shaped rotor magnets are arranged in a direction of the rotor axis of the rotor, wherein the stators are disposed on both sides of the two plane-shaped rotor magnets, and the rotor driving coils and the bearing coils are provided on both sides of each of the stators. As a result, greater levitational force and rotation torque are obtained, and spatial 4-axis controls except positional control in a direction of the rotation axis can be performed.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A magnetic levitation motor comprising:
   at least one rotor with a rotor magnet magnetized in multiple poles; and
   at least one stator confronted with the rotor while supporting the rotor in a freely rotatable and non-contact manner, the stator having rotor driving coils disposed opposing to the rotor magnet for generating a rotational torque on the rotor, and bearing coils for generating a bearing force in a direction perpendicular to a rotational axis of the rotor,
   wherein the rotor driving coils and the bearing coils are shifted with respect to one another in a circumferential direction to avoid overlapping with one another such that portions of the coils located in a region where the stator confronts the rotor are arranged to avoid overlapping with one another, and portions of the coils in a region where the stator does not confront the rotor are permitted to overlay with one another, and
   wherein the number of rotor driving coils equals the number of bearing coils.

2. A magnetic levitation motor according to claim 1, further comprising a displacement sensor for detecting displacement of the rotor with respect to a plane which is perpendicular to the rotational axis of the rotor, wherein currents flowing in the bearing coils are controlled in accordance with output of the displacement sensor to keep the rotational axis of the rotor at a predetermined position.

3. A magnetic levitation motor according to claim 1, wherein the stator and rotor are arranged so as to constitute a planar confronting type motor.

4. A magnetic levitation motor according to claim 1, wherein the stator and rotor are arranged so as to constitute a cylindrical confronting type motor.

5. A magnetic levitation motor according to claim 1, wherein the rotor driving coils and the bearing coils have an identical shape.

6. A magnetic levitation motor according to claim 5, wherein the rotor driving coils and the bearing coils are integrated by a common wire in which current for generating the rotational torque and current for generating the bearing force flow in a superposed manner through the common wire.

7. A magnetic levitation motor according to claim 1, wherein the stator and the rotor are arranged in a planar confronting configuration, two plane-shaped rotor magnets are arranged in a direction of the rotor axis of the rotor, wherein the stators are disposed on both sides of the two plan-shaped rotor magnets to be interposed by the stators, and the rotor driving coils and the bearing coils are provided on both sides of each of the stators.

8. A magnetic levitation motor according to claim 4, wherein a pair of cylindrical rotor-stator sets are arranged along a rotational axis of the rotors.

9. A magnetic levitation motor according to claim 1, wherein salient poles are provided between the rotor driving coils and the bearing coils.

10. A magnetic levitation motor according to claim 1, wherein the number of poles of the rotor magnet is eight, and the number of poles of the bearing coils is six.

11. A magnetic levitation motor according to claim 1, wherein the number of poles of the rotor magnet is four, and the number of poles of the bearing coils of the stator is six.

12. A magnetic levitation motor according to claim 1, wherein the number of rotor driving coils is six and the number of bearing coils is six, wherein each of the rotor driving coils and bearing coils are connected so as to form three-phases, and wherein each of the rotor driving coils and bearing coils generates four magnetic poles.

13. A magnetic levitation motor according to claim 1, wherein each of the coils comprises two portions which are located in a region where the stator confronts the rotor, wherein one portion of the rotor driving coils is located between two portions of one of the bearing coils, and wherein one portion of the bearing coils is located between two portions of one of the rotor driving coils.

* * * * *